(12) United States Patent
Yao et al.

(10) Patent No.: US 11,120,314 B2
(45) Date of Patent: Sep. 14, 2021

(54) JOINT TRAINING OF NEURAL NETWORKS USING MULTI SCALE HARD EXAMPLE MINING

(71) Applicant: INTEL CORPORATION, Santa Clara, CA (US)

(72) Inventors: Anbang Yao, Beijing (CN); Yun Ren, Beijing (CN); Hao Zhao, Beijing (CN); Tao Kong, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 16/491,735

(22) PCT Filed: Apr. 7, 2017

(86) PCT No.: PCT/CN2017/079683
§ 371 (c)(1),
(2) Date: Sep. 6, 2019

(87) PCT Pub. No.: WO2018/184195
PCT Pub. Date: Oct. 11, 2018

(65) Prior Publication Data
US 2021/0133518 A1 May 6, 2021

(51) Int. Cl.
 *G06K 9/68* (2006.01)
 *G06K 9/62* (2006.01)
 (Continued)

(52) U.S. Cl.
 CPC ......... *G06K 9/6857* (2013.01); *G06K 9/6281* (2013.01); *G06N 3/04* (2013.01); *G06N 3/08* (2013.01)

(58) Field of Classification Search
None
See application file for complete search history.

(56) References Cited

U.S. PATENT DOCUMENTS

2007/0196013 A1* 8/2007 Li ..................... G06K 9/00456
382/159
2009/0271338 A1* 10/2009 Chidlovskii .......... G06F 16/906
706/12

(Continued)

FOREIGN PATENT DOCUMENTS

| CN | 106156793 A | 11/2016 |
|---|---|---|
| CN | 106446782 A | 2/2017 |
| EP | 2657857 A1 | 10/2013 |

OTHER PUBLICATIONS

International Search Report for related PCT Application Serial No. PCT/CN2017/079683 with a completion date of Jan. 2, 2018, and dated Jan. 10, 2018, 4 pages.

*Primary Examiner* — Fayyaz Alam
(74) *Attorney, Agent, or Firm* — Hanley, Flight & Zimmerman, LLC (57) ABSTRACT

An example apparatus for mining multi-scale hard examples includes a convolutional neural network to receive a mini-batch of sample candidates and generate basic feature maps. The apparatus also includes a feature extractor and combiner to generate concatenated feature maps based on the basic feature maps and extract the concatenated feature maps for each of a plurality of received candidate boxes. The apparatus further includes a sample scorer and miner to score the candidate samples with multi-task loss scores and select candidate samples with multi-task loss scores exceeding a threshold score.

25 Claims, 7 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2015/0110387 A1* | 4/2015 | Lienhart | G06K 9/6228 |
| | | | 382/159 |
| 2018/0068198 A1* | 3/2018 | Savvides | G06K 9/6274 |
| 2018/0096457 A1* | 4/2018 | Savvides | G06F 16/50 |
| 2019/0073553 A1* | 3/2019 | Yao | G06N 3/08 |
| 2020/0025935 A1* | 1/2020 | Liang | G06K 9/629 |
| 2021/0064001 A1* | 3/2021 | de Beus | G06N 3/08 |

* cited by examiner

JOINT TRAINING OF NEURAL NETWORKS USING MULTI SCALE HARD EXAMPLE MINING

CROSS REFERENCE TO RELATED APPLICATIONS

Pursuant to 35 U.S.C. § 371, this application is the United States National Stage Application of International Patent Application No. PCT/CN2017/079683, filed on Apr. 7, 2017, the contents of which are incorporated by reference as if set forth in their entirety herein.

BACKGROUND

Object detection may be used in computer vision to recognize and localize instances of object classes of interest appearing in digital images and video. For example, object detection may be used in various applications, such as scene understanding, augmented reality, image search, surveillance, and autonomous driving.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, object detection may be used for computer vision and various other applications. In some examples, neural networks can be used to detect objects in images. For example, convolutional neural networks (CNNs) may be trained to detect objects using positive and negative example images. The positive examples may be a group of annotated object instances. Negative examples may include background objects that are not an object to be detected. In one example, a sliding window strategy may be used to separately evaluate object classifiers at evenly spaced positions with various scales over an entire image. However, such a strategy may suffer from a training set that may have a serious imbalance between a number of positive examples and negative examples. For example, the imbalance ratio may be as high as 100,000 negative samples to one positive sample. In some examples, hard mining may be used as a solution to this imbalance. For example, hard mining may be an iterative training process that alternates between updating the detection model given the current set of examples, and then uses the updated model to find new false positives and add them to the bootstrapped training set with an incremental training procedure. However, hard example mining techniques for object detection may only work on the feature maps of a last convolutional layer in a CNN. Moreover, feature maps with different resolutions may be sensitive to objects of various sizes. Thus, hard examples may be different for feature maps with different resolutions. Hard examples, as used herein, may refer to example images that may have a higher probability of being a false positive or a false negative. In some examples, the hard examples may include both positive and negative hard examples. For example, hard positive example images may be images containing an object that may have a higher probability of not being detected as an object. A hard negative example may similarly be an image containing a background that may have a higher probability of being detected as an object.

The present disclosure relates generally to techniques for training neural networks. Specifically, the techniques described herein include an apparatus, method and system for training neural networks using multi-scale hard example mining. The techniques described herein include using a hard mining architecture that uses multiple scales. The techniques described herein include the use of combinations of multiple layers to enrich feature maps with multiple scales. The techniques include selecting hard examples within each mini-batch for feature maps of each scale. The techniques further include combining results of the mining in multi-scale feature maps.

The techniques described herein thus enable significant improvements in accuracy for CNN based object detection. In one experiment, an accuracy improvement of greater than 4.6% was noted over other methods. Thus, the techniques described herein may be used to train CNN based object detection systems to operate with improved accuracy. Moreover, the techniques are agnostic to the particular CNN used, and thus may be used to train any suitable CNN for improved detection of images.

Figure 1:
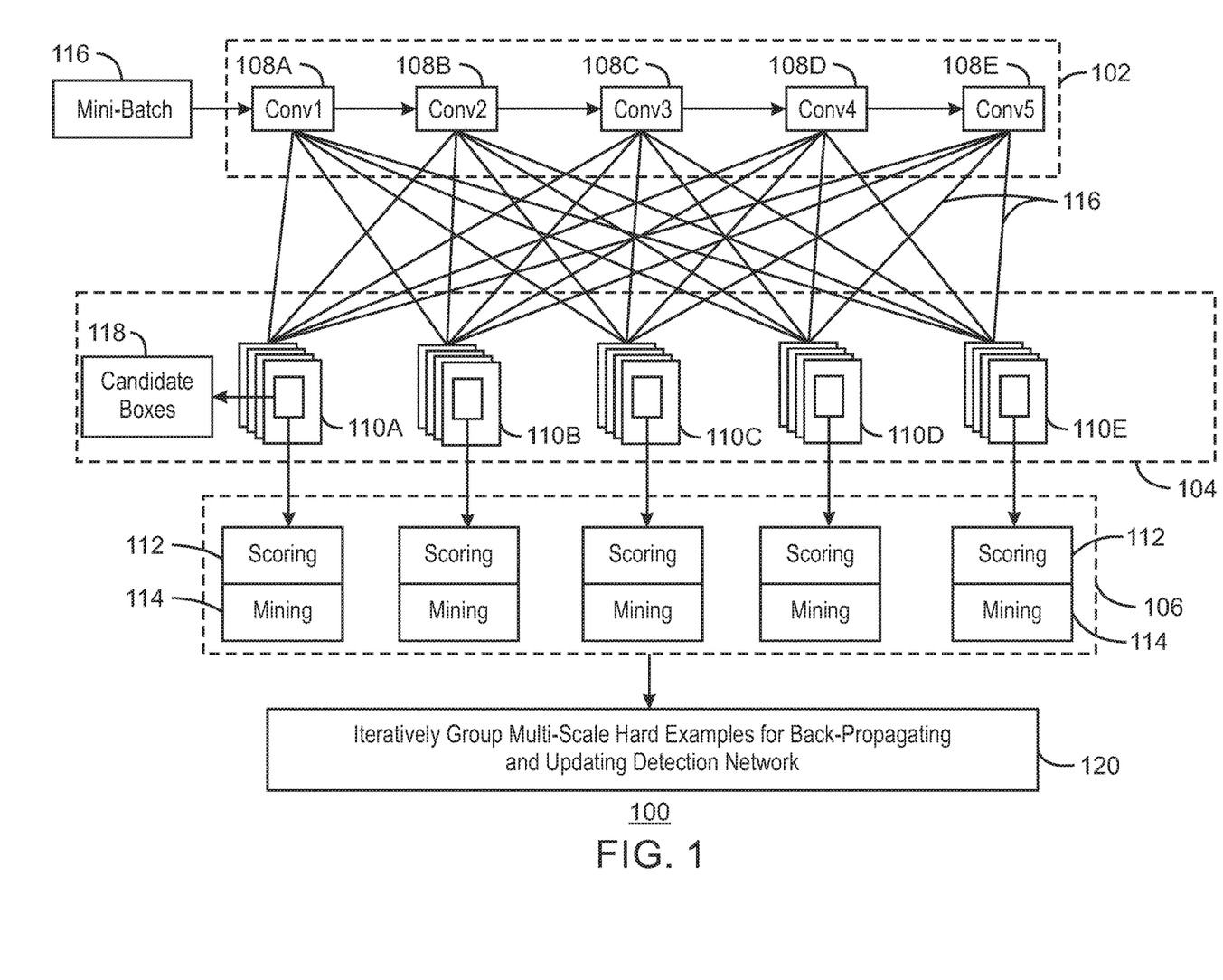
FIG. 1 is a block diagram illustrating an example system for mining multi-scale hard examples to be used for training neural networks.

FIG. 1 is a block diagram illustrating an example system for mining multi-scale hard examples to be used for training neural networks. The example system is referred to generally by the reference number 100 and can be implemented in the computing device 600 below in FIG. 6 using the method 200 of FIG. 2 below.

The example system 100 includes a convolutional module 102, a feature extraction and combination module 104, and a sample scoring and mining module 106. In some examples, the convolutional module 104 may a convolutional neural network. For example, the convolutional module 104 may be the Faster R-CNN, released in June 2015. For example, the Faster-R CNN may be a regional proposal network that can share full-image convolutional features with the detection network. Or the VGG-16 neural network. In some examples, the convolutional module 104 may use the convolutional layers of the 16 weight layer VGG-16 network model released in 2014. The convolutional module 102 includes a number of convolutional layers 108A, 1088, 108C, 108D, and 108E. The feature extraction and combination module 104 includes a number of concatenated feature maps 110A, 1108, 110C, 110D, and 110E. The sample scoring and mining module 106 includes a number of scoring layers and mining layers 114. For example, the sample scoring and mining module 106 is shown with a separate scoring layer 112 and mining layer 114 associated with each of the concatenated feature maps 110A, 110B, 110C, 110D, and 110E.

The convolutional module 102 is shown receiving a mini-batch 116 of example images for training. In some examples, the mini-batch may include positive and negative example images of objects for training. For example, the mini-batches may contain a few thousand images. In some examples, the example images received in the mini-batch man be resized into a standard scale. For example, the images may be resized to a shortest dimension of 600 pixels while keeping the aspect ratio of the image constant. In some examples, the mini-batches of example images may be used by the convolutional layer 102 to generate basic multi-scale feature maps. In some examples, each of the convolutional layers 108A, 1086, 108C, 108D, and 108E may have a different input size or resolution. For example, the convolutional layer 108A may have an input size of 200×200 pixels, the convolutional layer 1086 may have an input size of 100×100 pixels, the convolutional layer 108C may have an input size of 64×64 pixels, etc. In some examples, each of the convolutional layers may have an input size that is a fraction of the standard scale size. For example, the convolution layer 108C may have a size that is ⅛ of the standard resized scale discussed above. Each of the convolutional layers 108A, 1086, 108C, 108D, and 108E may thus generate feature maps with a native size matching the size of each of the layers.

In some examples, the feature extraction and combination module 104 can use each of the convolutional layers 108A, 1086, 108C, 108D, and 108E as a reference layer for up-sampling or down-sampling of the feature maps of the four other convolutional layers. For example, using a size 200×000 of convolutional layer 108A as reference, the feature maps generated by the convolutional layers 1086, 108C, 108D, and 108E may be up-sampled by the feature extraction and combination module 104 to size 200×200. For example, the feature extraction and combination module 104 may up-sample the 100×100 feature map of the convolutional layer 1086 to 200×200, up-sample the 64×64 feature map of the convolutional layer 108C to 200×200, etc. As used herein, up-sampling refers to generating a feature map with a larger size than a base feature map using techniques such as bi-linear interpolation or deconvolution of the base feature map. In some examples, resizing of images may be performed using convolution or pooling for down-sampling and deconvolution or linear interpolation for up-sampling.

In some examples, the feature extraction and combination module 104 may then concatenate the up-sampled feature maps from convolutional layers 1088, 108C, 108D, and 108E with the native size feature map of convolutional layer 108A to generate concatenated feature maps 110A. Concatenation, as used herein, refers to the generation of concatenated feature maps having multiple feature channels. For example, each channel of a concatenated feature map may be associated with one of the convolutional layers 108A, 1088, 108C, 108D, 108E and may be used to extract different features.

Similarly, for reference convolutional layer 108B, the feature extraction and combination module 104 can down-sample the feature map of convolutional layer 108A and up-sample the feature maps from convolutional layers 108C, 108D and 108E. The feature extraction and combination module 104 can may then concatenate the up-sampled and down-sampled feature maps with the feature map of reference layer 1088 to generate concatenated feature map 1108. A similar process may be performed for convolutional layers 108C, 108D, and 108E as reference layers, as indicated by lines 116. Thus, the concatenated feature maps 110A, 1108, 110C, 110D, and 110E may each include a set of feature maps from each of the convolutional layers 108A, 1088, 108C, 108D, and 108E, at a different size or resolution. In some examples, the convolutional layers 108A, 108B, 108C, 108D, and 108E may be made the same size using additional appended layers. For example, additional layers such as convolutional layers or pooling layers may be appended to the different layers to resize them accordingly.

In some examples, the concatenated feature maps 110A, 1108, 110C, 110D, and 110E may then be extracted for each of the candidate boxes 118 generated from the training example images received in the mini-batch 116. For example, a set of 60,000 candidate boxes may have been generated for two images received in the mini-batch 116. In some examples, the candidate boxes may have different sizes and aspect ratios. In some examples, the candidate boxes may be bounding boxes indicating locations of detected objects in the example images. In some examples, the candidate boxes may have been generated using any suitable regional proposal network. For example, the Faster R-CNN region proposal network with shared convolution features for detection may be used. As used herein, a region proposal network (RPN) may be a fully convolutional network that simultaneously predicts object bounds and objectness scores at each position in an image. In some examples, the RPN can automatically assign each candidate box with an objectness score. For example, an objectness score of 0.8 may mean that a candidate box has an 80% probability to be considered as an instance of object. In some examples, an object class may include 20, 100, or 200 categories, but may be jointly considered as one class or object. The probability of the candidate box to be considered as an instance of background may thus be 20%, as 0.8+ 0.2=1. Thus, in some examples, the region proposal network can classify each candidate box into object or background. In this way, the RPN may reduce a large number of candidate boxes of potential objects to a small number. For example, an initial set of 60,000 candidate boxes for two images with different sizes and different aspect ratios may be reduced to 2,000 candidate boxes. Thus, for two images in a mini-batch, the RPN may evaluate about 60,000 original candidate boxes and generate about 2,000 initial region proposals. In some examples, hard example mining may then be performed such that 300 region proposals are finally grouped for updating network parameters, as described below. The detection network may then further perform class-specific classification and localization.

In some examples, the RPN can group a subset of candidate samples with higher objectness scores from available candidate boxes. In some examples, since concatenated feature maps have different size compared to the original input image, the selected box sizes can be adapted to different concatenated layers. Thus, for each candidate box, each of the concatenated feature maps may be extracted. Extracting feature maps at multiple scales may provide significantly more discriminative features.

The sample scoring and mining module 106 may then score the candidate samples from the mini-batch and mine hard example samples from the scored candidate samples for training robust object detectors. In some examples, the sample scoring and mining module 106 may select hard examples using classification and localization losses calculated in respective Stochastic Gradient Descent (SGD) using an end-to-end joint training strategy. For example, to score candidate samples in a mini-batch 106, the sample scoring and mining module 106 may run the detection network trained by the feature extraction and combination module 104 over the candidate samples to obtain a classification score and localization score for each candidate sample. In some examples, the classification score can be used to measure a specific object class probability of a candidate box. For example, the classification score may be a vector indicating all class specific probabilities, including the background, with a sum equal to 1. In some examples, the localization score can be used to measure the localization accuracy of a detected candidate box. For example, the localization score can be the intersection of union between the detected box and the ground truth box. In some examples, the classification score and localization score can be used to generate a multi-task loss score. For example, multi-task loss score L is may be defined using the equation:

$$L(p,c,t,t')=L_{clf}(p,c)+\alpha c L_{bbr}(t,t') \qquad \text{Eq. 1}$$

where, in region proposal generation, p may be the probability of a region proposal to be classified as an object. And in object detection, p may be the probability distribution over K (e.g., K=20) object classes plus 1 background class. In some examples, a soft-max function may be used to predict the probability p. In addition, c may be the ground truth class label, $c \in \{0, 1 \ldots, K\}$, and when c=0, the region proposal is classified as background. Furthermore, $t=\{t_x, t_y, t_w, t_h\}$ may be the refined region proposal location obtained from bounding box regression, t' may be the respective ground truth location, and a may be a positive value to regularize two loss functions $L_{clf}$ and $L_{bbr}$, which correspond to classification loss and the localization loss, respectively. The sample scoring and mining module 106 may then select hard example sample candidates from all candidate boxes according to their multi-task loss score. For example, sample candidates with multi-task loss scores above a threshold score may be selected to be used for training.

In some examples, the sample scoring and mining module 106 may have four fully-connected layers (FCs). For example, the FCs may include a 4096-channel feature with random dropout, a 4096-channel feature with random dropout, a 21-channel classification score without random dropout, and an 84-channel localization score without random drop out. As used herein, dropout refers to a regularization technique for reducing overfitting in neural network by preventing complex co-adaptations on training data. For example, hidden or visible units may be dropped out in the neural network being trained. Dropout may be used to efficiently perform model averaging with neural networks. In some examples, dropout may be used to suppress overfitting at fully connected layers. For example, dropout may be used in directly setting 50% outputs at fully connected layers to zero stochastically. In some examples, the sample scoring and mining module 106 may use any suitable object detection network in the training stage. For example, the object detection network a may receive a mini-batch that may include only two images with thousands of candidate boxes. The sample scoring and mining module 106 can sub-sample candidate boxes with loss values exceeding a threshold value. In some examples, the sample scoring and mining module 106 may select a fixed number of high-loss examples to execute a back-propagation and fine-tune the parameters of the detection network as indicated at block 120. For example, each mini-batch of two images may include about 60,000 candidate boxes, and 300 hard examples may be selected to train the detection network. In some examples, additional hard examples can be incrementally collected by processing additional mini-batches in a similar manner.

The diagram of FIG. 1 is not intended to indicate that the example system 100 is to include all of the components shown in FIG. 1. Rather, the example system 100 can be implemented using fewer or additional components not illustrated in FIG. 1 (e.g., additional convolutional layers, modules, concatenated feature maps, mini-batches, candidate boxes, hard examples, etc.).

Figure 2:
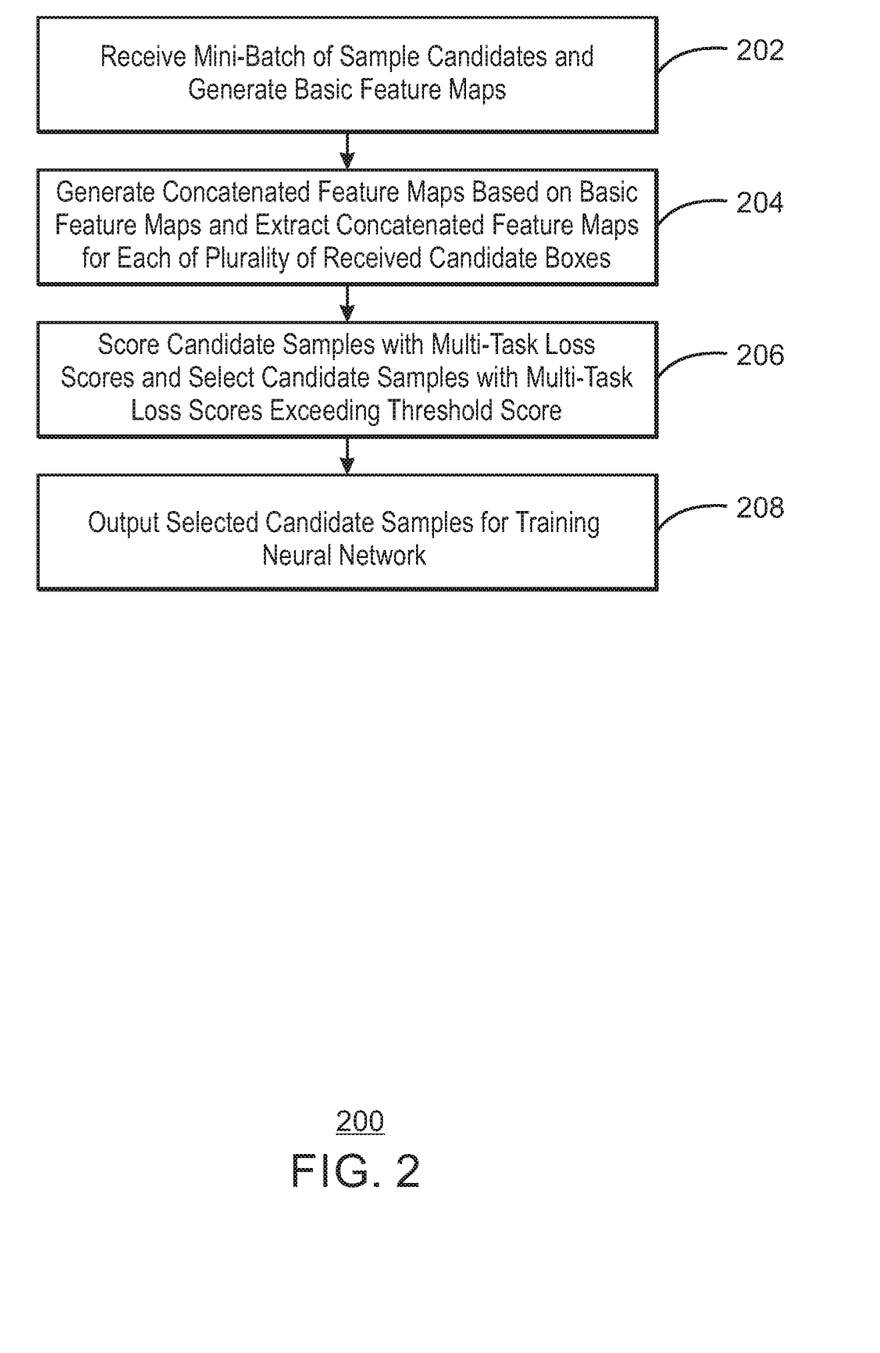
FIG. 2 is a flow chart illustrating an example method for multi-scale hard example mining.

FIG. 2 is a flow chart illustrating an example method for multi-scale hard example mining. The example method is generally referred to by the reference number 200 and can be implemented in the system 100 of FIG. 100 above, using the processor 602 or multi-scale hard miner 628 of the computing device 600 of FIG. 6 below, or the computer readable media 700 of FIG. 7 below.

At block 202, a multi-scale hard miner receive a mini-batch of sample candidates and generate basic feature maps. In some examples, the mini-batch may include positive example images and negative example images. In some example, the multi-scale hard miner can resize sample candidates from the received mini-batch into a standard scale.

At block 204, the multi-scale hard miner generates concatenated feature maps based on the basic feature maps and extracts the concatenated feature maps for each of a plurality of received candidate boxes. For example, each of the concatenated feature maps may include a plurality of channels including the basic feature maps resized to a reference layer size. In some example, the multi-scale hard miner can select a reference layer in the convolutional neural network and up-sample or down-sample feature maps from other layers in the convolutional neural network to generate the concatenated feature maps. For example, each concatenated feature maps may include a feature map of the reference layer and the up-sampled or down-sampled feature maps of other layers in a convolutional neural network.

At block 206, the multi-scale hard miner scores the candidate samples with multi-task loss scores and select candidate samples with multi-task loss scores exceeding a threshold score. For example, the multi-scale hard miner can calculate the multi-task loss score for each candidate sample based on a localization score and a classification score corresponding to classification and localization losses calculated for each candidate sample in a respective Stochastic Gradient Descent (SGD).

At block 208, multi-scale hard miner outputs the selected candidate samples for training a neural network. In some examples, the multi-scale hard miner can iteratively group predetermined number of the selected sample candidates for back-propagating and updating a detection network. For example, the predetermined number of selected sample candidates may be used to jointly train a region proposal network and a detection network.

This process flow diagram is not intended to indicate that the blocks of the example process 200 are to be executed in any particular order, or that all of the blocks are to be included in every case. Further, any number of additional blocks not shown may be included within the example process 200, depending on the details of the specific implementation.

Figure 3:
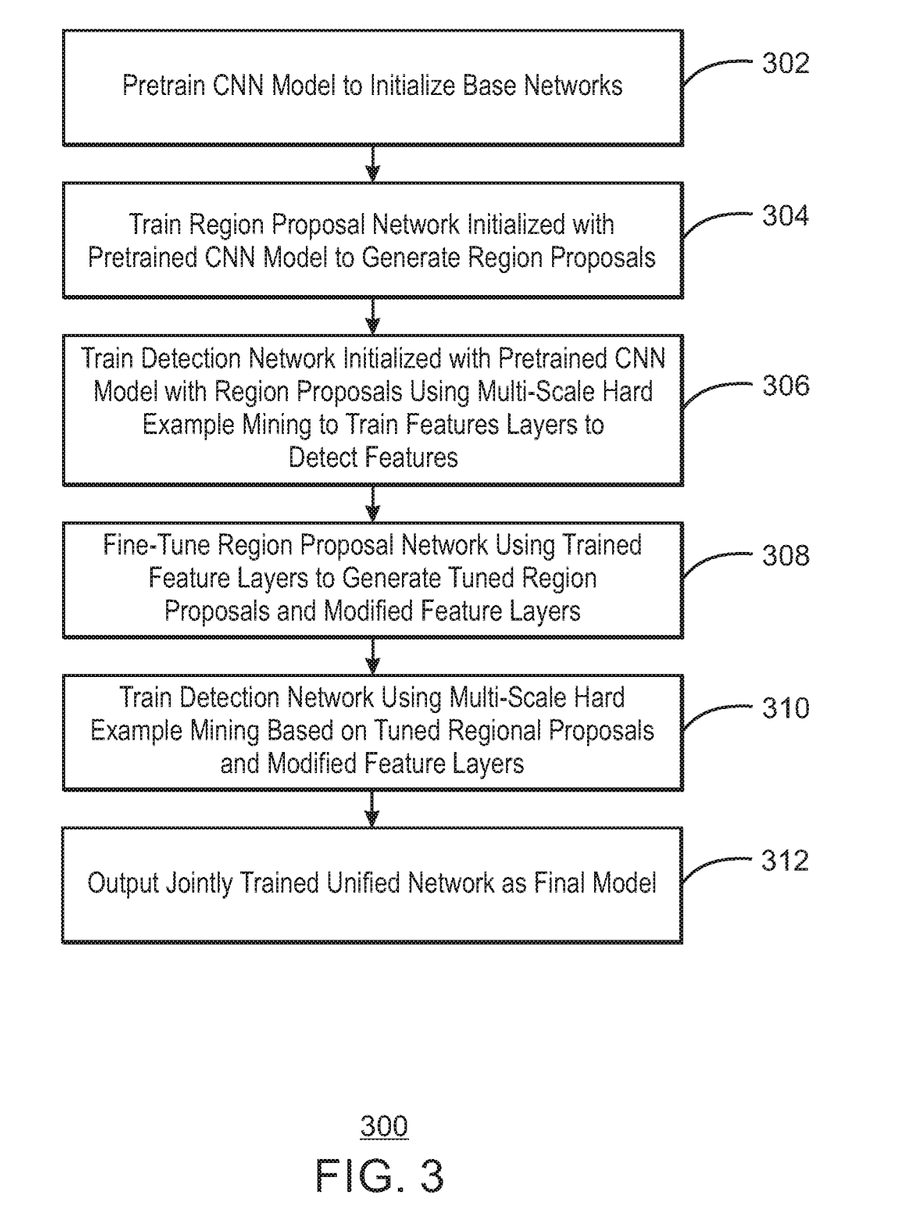
FIG. 3 is a flow chart illustrating an example method for jointly training a region proposal network and a detection network using multi-scale hard example mining.

FIG. 3 is a flow chart illustrating a method for training a neural network to detect objects using multi-scale hard example mining. The example method is generally referred to by the reference number 300 and can be implemented in the system 100 of FIG. 100 above, using the processor 602 of the computing device 600 of FIG. 6 below, or the computer readable media 700 of FIG. 7 below.

At block 302, the processor pretrains a convolutional neural network (CNN) model to initialize base networks. As used herein, pretraining refers to unsupervised training using large amounts of data. In some examples, the CNN may be pretrained using any suitable large scale object classification dataset. For example, the object classification dataset may include millions of images with manual labeled annotations. In some examples, the base networks may include a region proposal network, such as the region proposal network discussed at block 304 below. In some examples, the base networks may also include a detection network, such as the detection network discussed at block 306 below. In some examples, the detection network may be a very deep neural network, such as the VGG-16 neural network. In some examples, pretraining the CNN model includes using mini-batches of example images including positive examples and negative examples. Pretraining may improve the generalization accuracy of the CNN model used to initialize the base networks.

At block 304, the processor trains a region proposal network initialized with the trained CNN model to generate region proposals. In some examples, one or more basic layers of the region proposal network may be initialized using the CNN model to generate region proposals to be used at block 306 below. In some examples, the processor can train the region proposal network to generate a plurality of candidate boxes with a plurality of sizes and a plurality of scales based on a reference layers in the pretrained CNN model. In some examples, the processor may train the region proposal network to calculate objectness scores for a plurality of candidate boxes and select candidate boxes with objectness scores above a threshold score to generate the region proposals. For example, the region proposals may be candidate boxes having relatively high probabilities of containing an object. Thus, for example, an initial set of 60,000 candidate boxes may be reduced to a set of 2,000 region proposals via the region proposal network.

At block 306, the processor trains a detection network initialized with the pretrained CNN model with the region proposals using multi-scale hard example mining to train feature layers to detect features. For example, the feature layers may be shared layers that are to be shared between the detection network and the region proposal network. In some examples, multi-scale hard example mining may include selecting hard examples within a received mini-batch of example images based on classification and localization losses calculated in a respective Stochastic Gradient Descent (SGD) for feature maps of each scale. In some examples, multi-scale hard example mining may include generating concatenated feature maps and extracting the concatenated feature maps for a plurality of received candidate boxes from the region proposal network. In some examples, the multi-scale hard mining may be performed as described with respect to the system 100 above. For example, the hard example mining may be used to reduce the set of 2,000 region proposals to a set of 300 hard examples to be used in back-propagation as discussed below.

At block 308, the processor fine-tunes the region proposal network using the trained feature layers to generate tuned region proposals and modify the trained feature layers. For example, the processor may share the feature layers trained at block 306 with the region proposal network. In some examples, the tuned region proposals may be mined hard examples. The processor may then back-propagate parameters of the region proposal network during the training to modify the shared feature layers. For example, one or more parameters of the shared feature layers may be modified during the training to produce modified feature layers.

At block 310, the processor trains the detection network using multi-scale hard example mining based on the tuned region proposals and the modified feature layers. For example, the processor may share the modified feature layers produced at block 308 with the detection network to train the network using the tuned region proposals generated at block 308.

At block 312, the processor outputs a jointly trained unified network as a final model. For example, the unified network may include both a region proposal network and a detection network that may have been jointly trained at blocks 308 and 310 above. For example, the output final model may be the object detector 630 of FIG. 6 below. In some examples, the output final model may be able to jointly handle region proposal generation and object detection. For example, the unified network may be able to concurrently process region proposal generation and object detection in a single execution.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
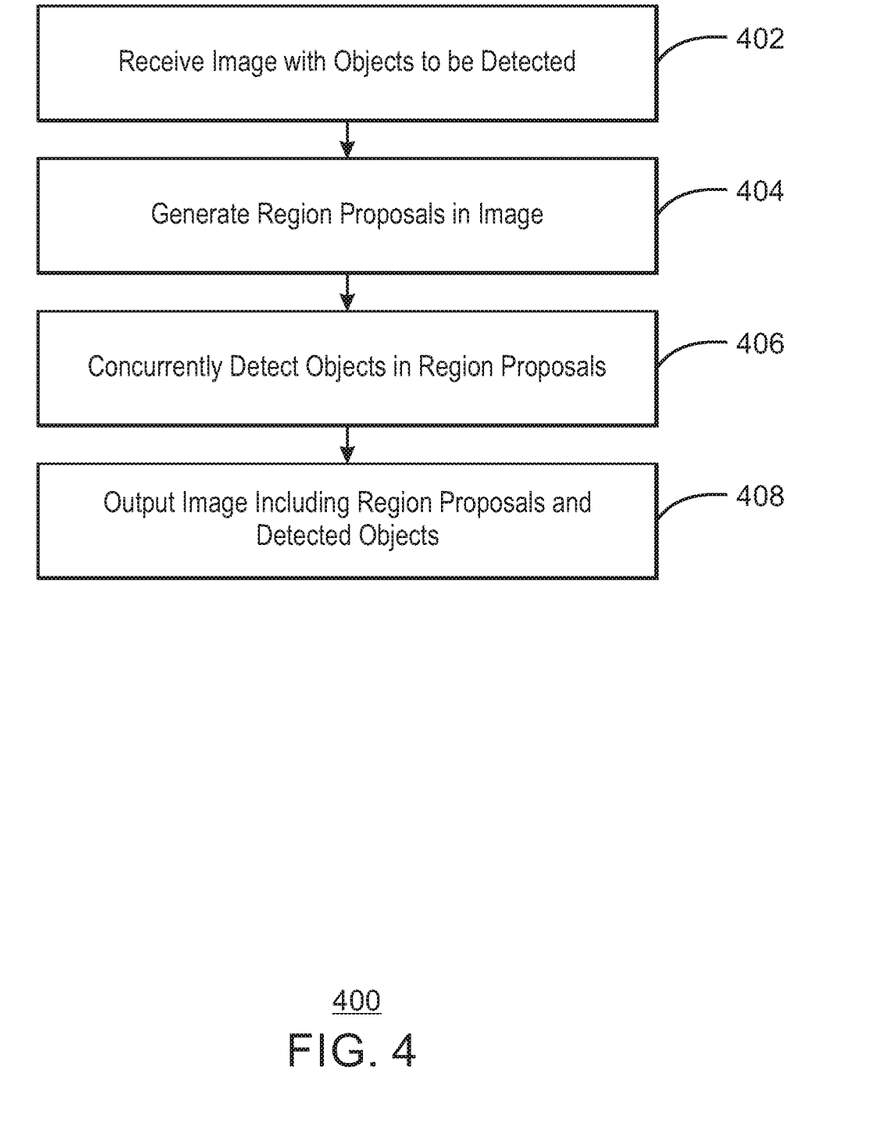
FIG. 4 is a diagram illustrating an example method for detecting objects.

FIG. 4 is a flow chart illustrating a method for detecting objects. The example method is generally referred to by the reference number 400 and can be implemented in the object detector 540 of the computing device 600 of FIG. 6 below.

At block 402, an object detector receives an image with an object to be detected. For example, the image may have been captured using an imaging device, such as a camera.

At block 404, the object detector detects the object in the received image. For example, the object detector may have been trained to detect the object using multi-scale hard example mining. In some examples, the object detector may have been trained using the method 300 of FIG. 3 above.

At block 406, the object detector concurrently detects objects in the region proposals. For example, the detected objects may be persons, animals, vehicles, etc.

At block 408, the object detector outputs an image including a regional proposals and detected objects. For example, the region proposals may be displayed as bounding boxes including the detected objects. In some examples, the detected objects may be indicated by labels adjacent to or inside the bounding boxes.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
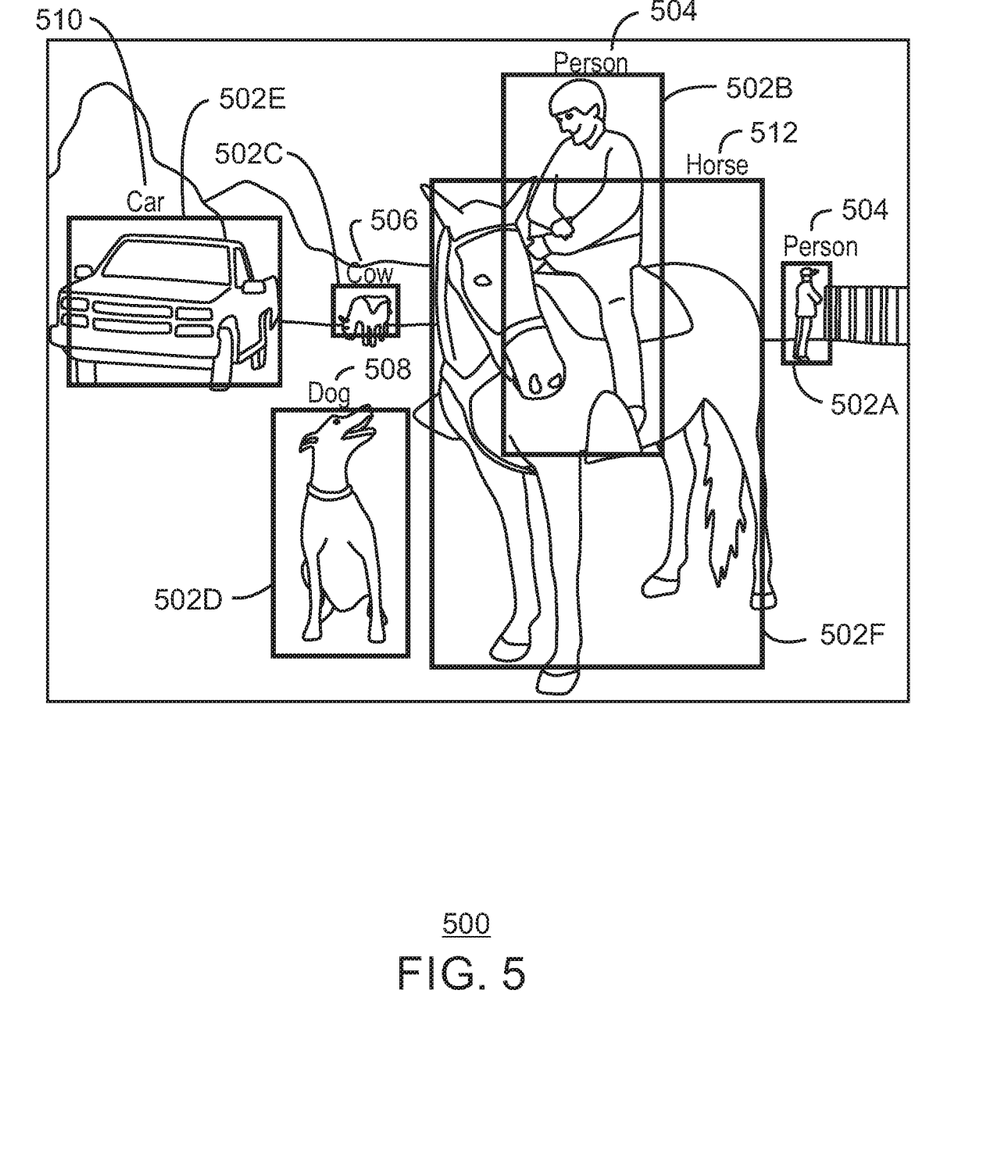
FIG. 5 is diagram of an example set of detection results.

FIG. 5 is a diagram illustrating an example set of detection results. The example set of detection results is generally referred to by the reference number 500 and can be implemented in the computing device 600 below. For example, the detection results 500 can be generated using the object detector 630 of the computing device 600 of FIG. 6 below.

FIG. 5 shows a set of detection results 500. For example, the detection results 400 may have been produced by a CNN trained using multi-scale hard example mining as discussed above. The detection results 400 include region proposals 402A, 402B, 402C, 402D, 402E, and 402F. Region proposals 402A and 402B have been detected as being a person 404. Region proposal 402C has been detected as a cow 406. Region proposal 402D has been detected as a dog 408. Region proposal 402E has been detected as a car 410. Region proposal 402F has been detected as being a horse 410.

As shown in FIG. 4, each of the region proposals 402A, 402B, 402C, 402D, 402E, and 402F is indicated using a bounding box for each detected object. In some examples, each type of object may have been classified using a layer trained to classify objects of that type. For example, the two persons 404 in region proposals 402A and 402B may have been classified by one layer, the cow 406 may have been classified by another layer, the dog 408 by yet another layer, the car 410 by another layer, and the horse 412 by yet another different layer. In some examples, the layers may have been trained using features from different scales and using hard examples of each of the object types. For example, negative example images with backgrounds often mistaken for people and positive example images with people often mistaken for backgrounds may have been used to train the layer responsible for classifying the two persons 404. In some examples, using hard examples of both positive examples and negative examples may improve detection accuracy, while also reducing the number of example images to be used to train a CNN.

The diagram of FIG. 4 is not intended to indicate that the example detection results 400 are to include all of the components shown in FIG. 4. Rather, the example detection results 400 can include fewer or additional components not illustrated in FIG. 4 (e.g., additional detected objects, labels, information, etc.).

Figure 6:
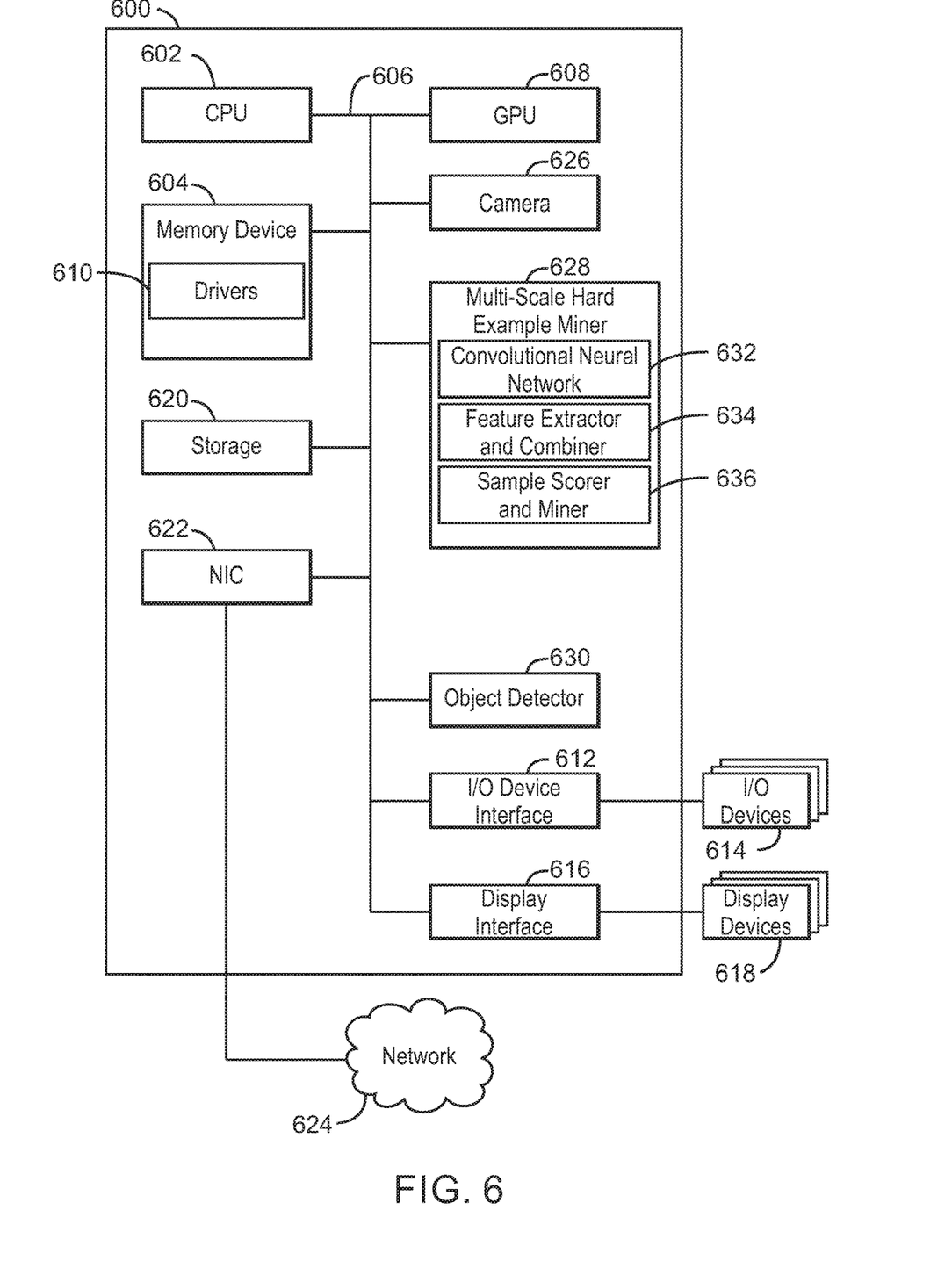
FIG. 6 is block diagram illustrating an example computing device that can mine multi-scale hard examples for training a neural network and detect objects using the trained neural network.

Referring now to FIG. 6, a block diagram is shown illustrating an example computing device that can mine multi-scale hard examples for training a neural network and detect objects using the trained neural network. The computing device 600 may be, for example, a laptop computer, desktop computer, game console, smart television, tablet computer, mobile device, embedded device, or wearable device, among others. In some examples, the computing device 600 may be a smart camera or a digital security surveillance camera. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for device discovery. The device drivers 610 may be software, an application program, application code, or the like.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating virtual input devices. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera may include one or more light sensors. In some example, the depth camera may be a high-definition red-green-blue (RGB) camera. In some examples, the camera 626 may be a webcam, or any other suitable imaging device.

The computing device 600 further includes a multi-scale hard example miner 628. For example, the multi-scale hard example miner 628 can be used to perform multi-scale hard example mining to generate hard example samples for training a neural network. For example the neural network may be the object detector 630. The multi-scale hard example miner 628 can include a convolutional neural network (CNN) 632, a feature extractor and combiner 634, a sample scorer and miner 636, and a trained CNN generator 638. In some examples, each of the components 632-638 of the trainer 628 may be a microcontroller, embedded processor, or software module. In some examples, the sample scorer and miner may include a network of fully-connected layers. The convolutional neural network 632 can receive a mini-batch of sample candidates and generate basic feature maps. For example, the mini-batch may include negative example images and positive example images to be used for training. In some examples, the convolutional neural network 632 can resize sample candidates from the received mini-batch into a standard scale. The feature extractor and combiner 634 can generate concatenated feature maps based on the basic feature maps and extract the concatenated feature maps for each of a plurality of received candidate boxes. For example, the candidate boxes may be generated by a region proposal network in response to receiving a plurality of mini-batches of example images. In some examples, each of the concatenated feature maps may include a plurality of channels including the basic feature maps resized to a reference layer size. In some examples, the feature extractor and combiner 634 can select a reference layer in the convolutional neural network and up-sample or down-sample feature maps from other layers in the convolutional neural network to generate the concatenated feature maps including a feature map of the reference layer and the up-sampled or down-sampled feature maps of other layers in the convolutional neural network. The sample scorer and miner 636 can score the candidate samples with multi-task loss scores and select candidate samples with multi-task loss scores exceeding a threshold score. For example, the sample scorer and miner 636 can calculate the multi-task loss score for each candidate sample based on a localization score and a classification score corresponding to classification and localization losses calculated for each candidate sample in a respective Stochastic Gradient Descent (SGD). In some examples, a predetermined number of the selected sample candidates can be iteratively grouped for back-propagating and updating a detection network. In some examples, the selected sample candidates can be used to jointly train a region proposal network and a detection network. For example, the resulting jointly trained region proposal network and detection network may be the object detector 630 below.

The object detector 630 thus may be a neural network trained by the trainer 628 using multi-scale hard example mining as described in FIG. 2 above. For example, the object detector 630 may be a convolutional neural network. For example, the object detector 630 may include a jointly trained region proposal network and detection network. In some examples, the object detector 630 can be used to concurrently generate region proposals and detect objects in images. For example, the object detector 630 can receive an image with an object to be detected. The object detector 630 can then generate a region proposal in the image. The object detector 630 can then concurrently detect the object in the region proposal.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the CPU 602 may be partially, or entirely, implemented in hardware and/or in a processor. For example, the functionality of the trainer 628 may be implemented with an application specific integrated circuit, in logic implemented in a processor, in logic implemented in a specialized graphics processing unit such as the GPU 608, or in any other device.

Figure 7:
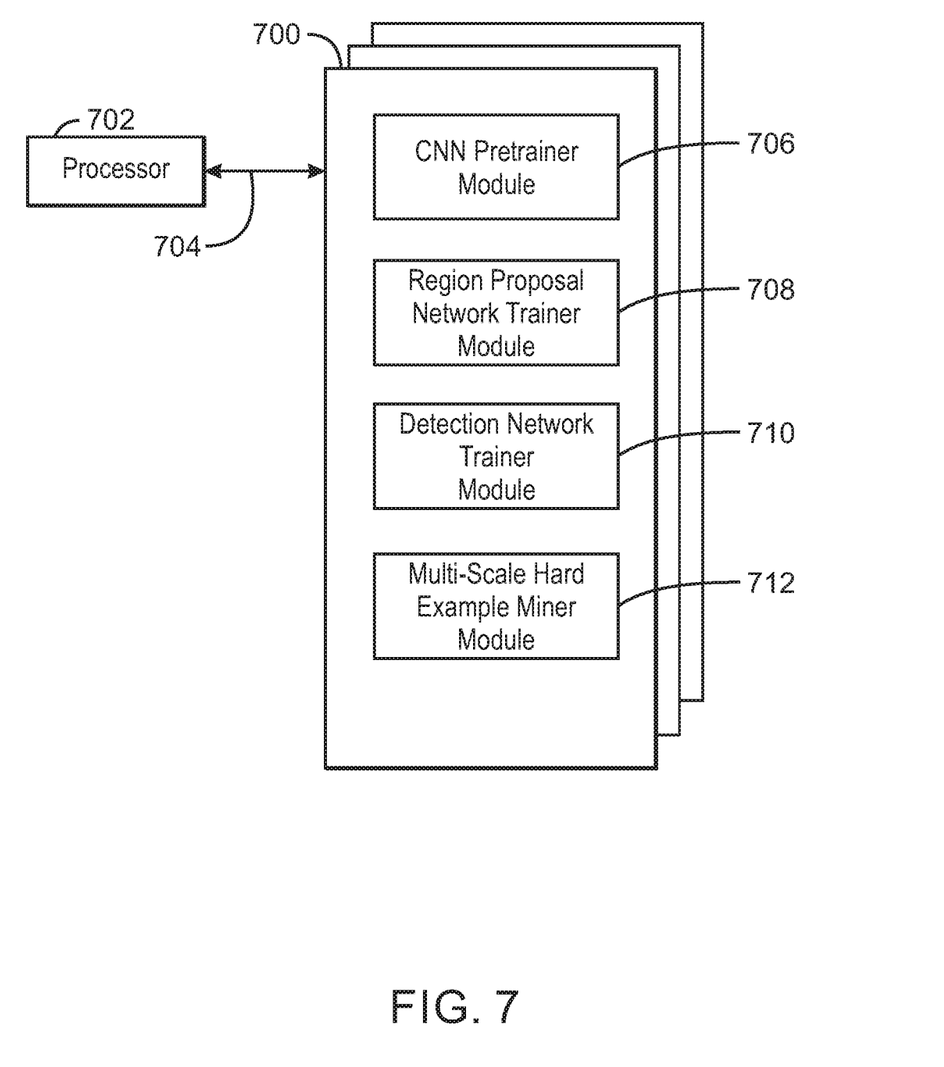
FIG. 7 is a block diagram showing computer readable media that store code for training a neural network using multi-scale hard example mining.

FIG. 7 is a block diagram showing computer readable media 700 that store code for training a neural network using multi-scale hard example mining. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a convolutional neural network (CNN) pretrainer 706 may be configured to pretrain a convolutional neural network (CNN) model to initialize base networks including a region proposal network and a detection network. For example, the base networks may include a region proposal network and an object detection network. In some examples, the CNN pretrainer 706 may be configured to pretrain the CNN model using mini-batches of example images including positive examples and negative examples. A region proposal network trainer module 708 may be configured to train a region proposal network initialized with the pretrained CNN model to generate region proposals. In some examples, the convolutional neural network (CNN) pretrainer 706 may be configured to pretrain a convolutional neural network (CNN) model to generate a plurality of candidate boxes with a plurality of sizes and a plurality of scales based on reference layers in the pretrained CNN model. For example, the region proposal network trainer module 708 may be configured to train the region proposal network to score the generated candidate boxes with objectness scores and select candidate boxes with objectness scores exceeding a threshold score to generate the region proposals. In some examples, the region proposals may be areas of an image including objects to be detected. A detection network trainer module 710 may be configured to train a detection network initialized with the pretrained CNN model with the region proposals using multi-scale hard example mining to train feature layers to detect features. In some examples, the feature layers may be shared layers. For example, the feature layers may be shared between the region proposal network and a detection network. In some examples, the features may be objects such as persons, cats, dogs, horses, etc. In some examples, the detection network trainer module 710 may be configured to use hard examples mined from a set of training mini-batches of images to train the feature layers. For example, the hard examples may be received from the multi-scale hard example miner module 712 described below. The region proposal network trainer module 708 may be configured to fine-tune the region proposal network using the trained feature layers to generate tuned region proposals and modified feature layers. For example, the tuned region proposals may be mined hard examples. The detection network trainer module 710 may be configured to train the detection network using multi-scale hard example mining based on the tuned region proposals and the modified feature layers. For example, the detection network trainer module 710 may be configured to back-propagate the tuned region proposals to jointly train the region proposal network and the detection network. In some examples, the jointly trained region proposal network and detection networks may then be used to concurrently generate region proposals and detect objects in the generated region proposals.

In some examples, a multi-scale hard example miner module 712 may be configured to receive a plurality of candidate boxes and sub-sample the candidate boxes based on loss values calculated for each of the candidate boxes. For example, the multi-scale hard example miner module 712 may be configured to receive a plurality of candidate boxes and select a fixed number of high-loss examples from the plurality of candidate boxes to be used to execute a back-propagation and fine-tune parameters of the detection network. In some examples, the multi-scale hard example miner module 712 may be configured to select a reference layer in the CNN model and up-sample or down-sample feature maps from other layers in the CNN model to generate a concatenated feature map including a feature map of the reference layer and the up-sampled or down-sampled feature maps of the other layers. In some examples, the multi-scale hard example miner module 712 may be configured to resize example images from a received mini-batch into a standard scale The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for mining multi-scale hard examples. The apparatus includes a convolutional neural network to receive a mini-batch of sample candidates and generate basic feature maps. The apparatus also includes a feature extractor and combiner to generate concatenated feature maps based on the basic feature maps and extract the concatenated feature maps for each of a plurality of received candidate boxes. The apparatus further includes a sample scorer and miner to score the candidate samples with multi-task loss scores and select candidate samples with multi-task loss scores exceeding a threshold score.

Example 2 includes the apparatus of example 1, including or excluding optional features. In this example, the candidate boxes are to be generated by a region proposal network in response to receiving a plurality of mini-batches of example images.

Example 3 includes the apparatus of any one of examples 1 to 2, including or excluding optional features. In this example, each of the concatenated feature maps include a plurality of channels including the basic feature maps resized to a reference layer size.

Example 4 includes the apparatus of any one of examples 1 to 3, including or excluding optional features. In this example, the multi-task loss score for each candidate sample is to be calculated based on a localization score and a classification score corresponding to classification and localization losses calculated for each candidate sample in a respective Stochastic Gradient Descent (SGD).

Example 5 includes the apparatus of any one of examples 1 to 4, including or excluding optional features. In this example, the convolutional neural network is to resize sample candidates from the received mini-batch into a standard scale.

Example 6 includes the apparatus of any one of examples 1 to 5, including or excluding optional features. In this example, the feature extractor and combiner is to select a reference layer in the convolutional neural network and up-sample or down-sample feature maps from other layers in the convolutional neural network to generate the concatenated feature maps including a feature map of the reference layer and the up-sampled or down-sampled feature maps of other layers in the convolutional neural network.

Example 7 includes the apparatus of any one of examples 1 to 6, including or excluding optional features. In this example, the mini-batch includes negative example images and positive example images to be used for training.

Example 8 includes the apparatus of any one of examples 1 to 7, including or excluding optional features. In this example, the sample scorer and miner includes a network of fully-connected layers.

Example 9 includes the apparatus of any one of examples 1 to 8, including or excluding optional features. In this example, a predetermined number of the selected sample candidates are iteratively grouped for back-propagating and updating a detection network.

Example 10 includes the apparatus of any one of examples 1 to 9, including or excluding optional features. In this example, the selected sample candidates are to be used to jointly train a region proposal network and a detection network.

Example 11 is a method for training a neural network. The method includes pretraining, via a processor, a CNN model to initialize base networks, the base networks including a region proposal network and a detection network. The method also includes training, via the processor, the region proposal network initialized with the pretrained CNN model to generate region proposals. The method further includes training, via the processor, the detection network initialized with the pretrained CNN model with the region proposals using multi-scale hard example mining to train feature layers to detect features. The method further also includes fine tuning, via the processor, the region proposal network using the trained feature layers to generate tuned region proposals and modified feature layers. The method includes training, via the processor, the detection network using multi-scale hard example mining based on the tuned region proposals and the modified feature layers.

Example 12 includes the method of example 11, including or excluding optional features. In this example, multi-scale hard example mining includes selecting hard examples within a received mini-batch of example images based on classification and localization losses calculated in a respective Stochastic Gradient Descent (SGD) for feature maps of each scale.

Example 13 includes the method of any one of examples 11 to 12, including or excluding optional features. In this example, multi-scale hard example mining includes generating concatenated feature maps and extracting the concatenated feature maps for a plurality of received candidate boxes from the region proposal network.

Example 14 includes the method of any one of examples 11 to 13, including or excluding optional features. In this example, pretraining the CNN model includes using a large scale object classification dataset.

Example 15 includes the method of any one of examples 11 to 14, including or excluding optional features. In this example, fine tuning the region proposal network includes back-propagating parameter values based on generated feature layers from an initialized detection network.

Example 16 includes the method of any one of examples 11 to 15, including or excluding optional features. In this example, training region proposal network includes training the region proposal network to calculate objectness scores for a plurality of candidate boxes and select candidate boxes with objectness scores above a threshold score to generate the region proposals.

Example 17 includes the method of any one of examples 11 to 16, including or excluding optional features. In this example, the tuned region proposals include mined hard examples.

Example 18 includes the method of any one of examples 11 to 17, including or excluding optional features. In this example, the trained feature layers include shared layers.

Example 19 includes the method of any one of examples 11 to 18, including or excluding optional features. In this example, training the region proposal network includes training the region proposal network to generate a plurality of candidate boxes with a plurality of sizes and a plurality of scales based on a reference layers in the pretrained CNN model.

Example 20 includes the method of any one of examples 11 to 19, including or excluding optional features. In this example, pretraining the CNN model includes using mini-batches of example images including positive examples and negative examples Example 21 is at least one computer readable medium for training a neural network having instructions stored therein that. The computer-readable medium includes instructions that direct the processor to pretrain a convolutional neural network (CNN) model to initialize base networks including a region proposal network and a detection network. The computer-readable medium also includes instructions that direct the processor to train a region proposal network initialized with the pretrained CNN model to generate region proposals. The computer-readable medium further includes instructions that direct the processor to train a detection network initialized with the pretrained CNN model with the region proposals using multi-scale hard example mining to train feature layers to detect features. The computer-readable medium also further includes instructions that direct the processor to fine tune the region proposal network using the trained feature layers to generate tuned region proposals and modified feature layers. The computer-readable medium also includes instructions that direct the processor to train the detection network using multi-scale hard example mining based on the tuned region proposals and the modified feature layers.

Example 22 includes the computer-readable medium of example 21, including or excluding optional features. In this example, the computer-readable medium includes instructions to receive a plurality of candidate boxes and sub-sample the candidate boxes based on loss values calculated for each of the candidate boxes.

Example 23 includes the computer-readable medium of any one of examples 21 to 22, including or excluding optional features. In this example, the computer-readable medium includes instructions to receive a plurality of candidate boxes and select a fixed number of high-loss examples from the plurality of candidate boxes to be used to execute a back-propagation and fine tune parameters of the detection network.

Example 24 includes the computer-readable medium of any one of examples 21 to 23, including or excluding optional features. In this example, the computer-readable medium includes instructions to select a reference layer in the CNN model and up-sample or down-sample feature maps from other layers in the CNN model to generate a concatenated feature map including a feature map of the reference layer and the up-sampled or down-sampled feature maps of other layers in the CNN model.

Example 25 includes the computer-readable medium of any one of examples 21 to 24, including or excluding optional features. In this example, the computer-readable medium includes instructions to resize example images from a received mini-batch into a standard scale.

Example 26 includes the computer-readable medium of any one of examples 21 to 25, including or excluding optional features. In this example, the computer-readable medium includes instructions to train the region proposal network to score a plurality of candidate boxes with objectness scores and select candidate boxes with objectness scores exceeding a threshold score to generate the region proposals.

Example 27 includes the computer-readable medium of any one of examples 21 to 26, including or excluding optional features. In this example, the computer-readable medium includes instructions to back-propagate the tuned region proposals, wherein the tuned region proposals include mined hard examples.

Example 28 includes the computer-readable medium of any one of examples 21 to 27, including or excluding optional features. In this example, the trained feature layers include shared layers.

Example 29 includes the computer-readable medium of any one of examples 21 to 28, including or excluding optional features. In this example, the computer-readable medium includes instructions to train the region proposal network to generate a plurality of candidate boxes with a plurality of sizes and a plurality of scales based on reference layers in the pretrained CNN model.

Example 30 includes the computer-readable medium of any one of examples 21 to 29, including or excluding optional features. In this example, the computer-readable medium includes instructions to pretrain the CNN model using mini-batches of example images including positive examples and negative examples.

Example 31 is a system for mining multi-scale hard examples. The system includes a convolutional neural network to receive a mini-batch of sample candidates and generate basic feature maps. The system also includes a feature extractor and combiner to generate concatenated feature maps based on the basic feature maps and extract the concatenated feature maps for each of a plurality of received candidate boxes. The system further includes a sample scorer and miner to score the candidate samples with multi-task loss scores and select candidate samples with multi-task loss scores exceeding a threshold score.

Example 32 includes the system of example 31, including or excluding optional features. In this example, the candidate boxes are to be generated by a region proposal network in response to receiving a plurality of mini-batches of example images.

Example 33 includes the system of any one of examples 31 to 32, including or excluding optional features. In this example, each of the concatenated feature maps include a plurality of channels including the basic feature maps resized to a reference layer size.

Example 34 includes the system of any one of examples 31 to 33, including or excluding optional features. In this example, the multi-task loss score for each candidate sample is to be calculated based on a localization score and a classification score corresponding to classification and localization losses calculated for each candidate sample in a respective Stochastic Gradient Descent (SGD).

Example 35 includes the system of any one of examples 31 to 34, including or excluding optional features. In this example, the convolutional neural network is to resize sample candidates from the received mini-batch into a standard scale.

Example 36 includes the system of any one of examples 31 to 35, including or excluding optional features. In this example, the feature extractor and combiner is to select a reference layer in the convolutional neural network and up-sample or down-sample feature maps from other layers in the convolutional neural network to generate the concatenated feature maps including a feature map of the reference layer and the up-sampled or down-sampled feature maps of other layers in the convolutional neural network.

Example 37 includes the system of any one of examples 31 to 36, including or excluding optional features. In this example, the mini-batch includes negative example images and positive example images to be used for training.

Example 38 includes the system of any one of examples 31 to 37, including or excluding optional features. In this example, the sample scorer and miner includes a network of fully-connected layers.

Example 39 includes the system of any one of examples 31 to 38, including or excluding optional features. In this example, a predetermined number of the selected sample candidates are iteratively grouped for back-propagating and updating a detection network.

Example 40 includes the system of any one of examples 31 to 39, including or excluding optional features. In this example, the selected sample candidates are to be used to jointly train a region proposal network and a detection network.

Example 41 is a system for mining multi-scale hard examples. The system includes means for receiving a mini-batch of sample candidates and generating basic feature maps. The system also includes means for generating concatenated feature maps based on the basic feature maps and extracting the concatenated feature maps for each of a plurality of received candidate boxes. The system further includes means for scoring the candidate samples with multi-task loss scores and selecting candidate samples with multi-task loss scores exceeding a threshold score.

Example 42 includes the system of example 41, including or excluding optional features. In this example, the candidate boxes are to be generated by a region proposal network in response to receiving a plurality of mini-batches of example images.

Example 43 includes the system of any one of examples 41 to 42, including or excluding optional features. In this example, each of the concatenated feature maps include a plurality of channels including the basic feature maps resized to a reference layer size.

Example 44 includes the system of any one of examples 41 to 43, including or excluding optional features. In this example, the multi-task loss score for each candidate sample is to be calculated based on a localization score and a classification score corresponding to classification and localization losses calculated for each candidate sample in a respective Stochastic Gradient Descent (SGD).

Example 45 includes the system of any one of examples 41 to 44, including or excluding optional features. In this example, the means for receiving the mini-batch of sample candidates and generating the basic feature maps is to resize sample candidates from the received mini-batch into a standard scale.

Example 46 includes the system of any one of examples 41 to 45, including or excluding optional features. In this example, the means for generating concatenated feature maps is to select a reference layer in the convolutional neural network and up-sample or down-sample feature maps from other layers in the convolutional neural network to generate the concatenated feature maps including a feature map of the reference layer and the up-sampled or down-sampled feature maps of other layers in the convolutional neural network.

Example 47 includes the system of any one of examples 41 to 46, including or excluding optional features. In this example, the mini-batch includes negative example images and positive example images to be used for training.

Example 48 includes the system of any one of examples 41 to 47, including or excluding optional features. In this example, the means for scoring the candidate samples and selecting the candidate samples includes a network of fully-connected layers.

Example 49 includes the system of any one of examples 41 to 48, including or excluding optional features. In this example, a predetermined number of the selected sample candidates are iteratively grouped for back-propagating and updating a detection network.

Example 50 includes the system of any one of examples 41 to 49, including or excluding optional features. In this example, the selected sample candidates are to be used to jointly train a region proposal network and a detection network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for mining multi-scale hard examples, comprising:
   a convolutional neural network to receive a mini-batch of sample candidates and generate basic feature maps;
   a feature extractor and combiner to generate concatenated feature maps based on the basic feature maps and extract the concatenated feature maps for each of a plurality of received candidate boxes; and
   a sample scorer and miner to score the candidate samples with multi-task loss scores and select candidate samples with multi-task loss scores exceeding a threshold score.

2. The apparatus of claim 1, wherein the candidate boxes are to be generated by a region proposal network in response to receiving a plurality of mini-batches of example images.

3. The apparatus of claim 1, wherein each of the concatenated feature maps comprise a plurality of channels comprising the basic feature maps resized to a reference layer size.

4. The apparatus of claim 1, wherein the multi-task loss score for each candidate sample is to be calculated based on a localization score and a classification score corresponding to classification and localization losses calculated for each candidate sample in a respective Stochastic Gradient Descent (SGD).

5. The apparatus of claim 1, wherein the convolutional neural network is to resize sample candidates from the received mini-batch into a standard scale.

6. The apparatus of claim 1, wherein the feature extractor and combiner is to select a reference layer in the convolutional neural network and up-sample or down-sample feature maps from other layers in the convolutional neural network to generate the concatenated feature maps comprising a feature map of the reference layer and the up-sampled or down-sampled feature maps of other layers in the convolutional neural network.

7. The apparatus of claim 1, wherein the mini-batch comprises negative example images and positive example images to be used for training.

8. The apparatus of claim 1, wherein the sample scorer and miner comprises a network of fully-connected layers.

9. The apparatus of claim 1, wherein a predetermined number of the selected sample candidates are iteratively grouped for back-propagating and updating a detection network.

10. The apparatus of claim 1, wherein the selected sample candidates are to be used to jointly train a region proposal network and a detection network.

11. A method for training a neural network, comprising:
    pretraining, via a processor, a CNN model to initialize base networks, the base networks comprising a region proposal network and a detection network;
    training, via the processor, the region proposal network initialized with the pretrained CNN model to generate region proposals;
    training, via the processor, the detection network initialized with the pretrained CNN model with the region proposals using multi-scale hard example mining to train feature layers to detect features;
    fine-tuning, via the processor, the region proposal network using the trained feature layers to generate tuned region proposals and modified feature layers; and
    training, via the processor, the detection network using multi-scale hard example mining based on the tuned region proposals and the modified feature layers.

12. The method of claim 11, wherein multi-scale hard example mining comprises selecting hard examples within a received mini-batch of example images based on classification and localization losses calculated in a respective Stochastic Gradient Descent (SGD) for feature maps of each scale.

13. The method of claim 11, wherein multi-scale hard example mining comprises generating concatenated feature maps and extracting the concatenated feature maps for a plurality of received candidate boxes from the region proposal network.

14. The method of claim 11, wherein pretraining the CNN model comprises using a large scale object classification dataset.

15. The method of claim 11, wherein fine-tuning the region proposal network comprises back-propagating parameter values based on generated feature layers from an initialized detection network.

16. The method of claim 11, wherein training region proposal network comprises training the region proposal network to calculate objectness scores for a plurality of candidate boxes and select candidate boxes with objectness scores above a threshold score to generate the region proposals.

17. The method of claim 11, wherein the tuned region proposals comprise mined hard examples.

18. The method of claim 11, wherein the trained feature layers comprise shared layers.

19. The method of claim 11, wherein training the region proposal network comprises training the region proposal network to generate a plurality of candidate boxes with a plurality of sizes and a plurality of scales based on a reference layers in the pretrained CNN model.

20. The method of claim 11, wherein pretraining the CNN model comprises using mini-batches of example images comprising positive examples and negative examples.

21. At least one non-transitory computer readable medium for training a neural network having instructions stored therein that, in response to being executed on a computing device, cause the computing device to: pretrain a convolutional neural network (CNN) model to initialize base networks comprising a region proposal network and a detection network; train a region proposal network initialized with the pretrained CNN model to generate region proposals; train a detection network initialized with the pretrained CNN model with the region proposals using multi-scale hard example mining to train feature layers to detect features; fine-tune the region proposal network using the trained feature layers to generate tuned region proposals and modified feature layers; and train the detection network using multi-scale hard example mining based on the tuned region proposals and the modified feature layers.

22. The at least one non-transitory computer readable medium of claim 21, comprising instructions to receive a plurality of candidate boxes and sub-sample the candidate boxes based on loss values calculated for each of the candidate boxes.

23. The at least one non-transitory computer readable medium of claim 21, comprising instructions to receive a plurality of candidate boxes and select a fixed number of high-loss examples from the plurality of candidate boxes to be used to execute a back-propagation and fine-tune parameters of the detection network.

24. The at least one non-transitory computer readable medium of claim 21, comprising instructions to select a reference layer in the CNN model and up-sample or down-sample feature maps from other layers in the CNN model to generate a concatenated feature map comprising a feature map of the reference layer and the up-sampled or down-sampled feature maps of other layers in the CNN model.

25. The at least one non-transitory computer readable medium of claim 21, comprising instructions to resize example images from a received mini-batch into a standard scale.

* * * * *